Patented Apr. 29, 1941

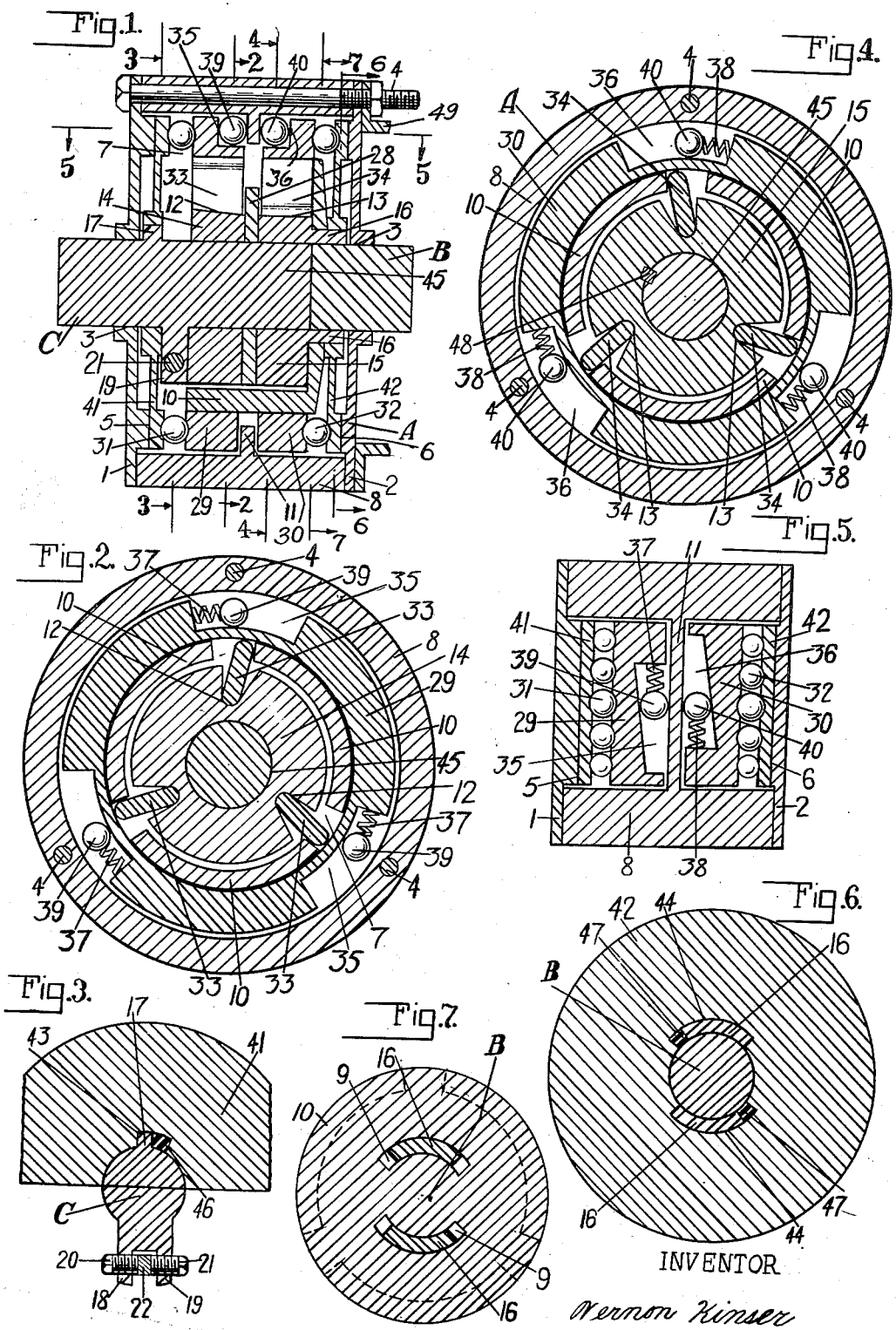

2,240,043

UNITED STATES PATENT OFFICE 2,240,043

AUTOMATIC SHAFT BRAKE DEVICE

Vernon Kinser, Butterfield, Mo.

Application December 28, 1939, Serial No. 311,251

7 Claims. (Cl. 192—8)

This invention relates generally to power transmission devices and has more particular reference to an automatic shaft brake device.

By an automatic shaft brake, I have specific reference to a power transmission device including controlling and controlled members, as driving and driven shafts or the like, wherein movement of the controlling member is necessary to permit and concurrently effect or permit motivation of the controlled member.

More specifically, my invention relates to a shaft brake employing a combination of frictional restraint and direct torque resistance to effect its purpose, which device, in some of its several well known forms, as heretofore employed, for example, in elevator hoists and automotive steering-gears, may be called an irreversible or self-locking gear, as embodied in a worm gear constructed in such a manner that manipulation or semi-manipulation of the worm is necessary to permit rotation of its mating gear-wheel, the lock being effected by the friction between the teeth of the gear-wheel and the worm, which serves to normally hold the gear-wheel against rotation.

Obviously, however, whenever the gear-wheel is carrying a load; the friction between the worm and the wheel is increased proportionately, and hence, in order to release, the worm, as may be said, from its frictional restraint in order to move the wheel, it is requisite to apply sufficient force to overcome the friction between the worm and wheel, and then to add to that force the effort required to effect the desired motivation of the load carried by the wheel, and this condition obtains, with consequent loss of energy required to release the worm from the wheel, whether, as in a hoist, the load is being raised or lowered or whether, as in an automotive steering-gear, the car is being turned, or straightened from a turn, and the like.

My present invention has hence for its prime object the provision of a device of the kind described wherein the controlled member may be restrained against motion which would tend to occur independently of actuation of the controlling member, motivation of the controlled member being wholly under the control of the controlling member, the controlled motion of the controlled member being effected, however, responsively to actuation of the controlling member in the desired direction, with merely a minimum holding or driving torque, that is to say, a substantially less effort than would be required to drive a worm from its frictional lock with its gear-wheel.

And with the above and other objects in view, my invention resides in the novel features of form, construction, arrangement, and combination of parts presently described and pointed out in the claims.

In the accompanying drawing (one sheet)—

Figure 1 is a longitudinal sectional view through an automatic shaft brake of my invention;

Figure 2 is a transverse sectional view of the unit, taken approximately along the line 2—2 Figure 1, the view being taken from the controlling end of the device;

Figure 3 is a transverse sectional view of the drive-shaft C and the braking-member 41, taken approximately along the line 3—3 Figure 1, the view being taken from the controlling end of the device;

Figure 4 is a transverse sectional view of the unit, taken approximately along the line 4—4 Figure 1, the view being taken from the controlling end of the device;

Figure 5 is a transverse sectional view of the unit, taken approximately along the line 5—5 Figure 1, the view being taken from the top of the sheet;

Figure 6 is a transverse sectional view of the braking-member 42, taken approximately along the line 6—6 Figure 1, the view being taken from the controlling end of the device; and Figure 7 is a transverse sectional view of the controlled member of the device, taken approximately along the line 7—7 Figure 1, the view being taken from the controlling end of the device.

Referring now more in detail and by reference characters to the drawing, which illustrates practical embodiments of my invention, the main frame of the device comprises a stationary restraining member or housing A, whose interior provides a race chamber 7, the housing A being composed of the annular member or ring 8, which is provided with a flange 11, and a pair of opposed end-plates 1, 2, respectively secured to the ring 8 by means of a suitable number of fastening elements or through bolts 4. As best seen in Figure 1, the bolts 4 extending suitably, for receiving fastening elements, not shown, whereby the housing A may be rigidly fixed or secured to some available stationary part as the housing of a hoist or of an automotive steering-gear 49, a fragment of which is shown.

The end-plates 1, 2 are equipped with respective central axially aligned bores 3 coincident with the axis of the circular outer ring 8 of the housing A, and are also provided with a pair of friction faces 5, 6, respectively, inwardly presented by the end-plates 1, 2, as best seen in Figure 1.

Interposed between the end-plates 1, 2 is a corresponding pair of complementary braking elements or braking-members 41, 42. The braking-members 41, 42 are disposed for respective operative engagement with the friction faces 5, 6, as also clearly seen in Figure 1.

Connected to the steering wheel of an automobile or some driving machine, as the case may be, is the controlling member of the device or, as it may be designated, the drive-shaft C. The drive-shaft C is journaled in the bore 3 of the end-plate 1 and in the race chamber 7 is provided with a hub 45, for purposes now appearing.

Mounted on the hub 45 is a pair of disk-like members 14, 15 and the separating washer 28, the disk-like member 15 being rigidly affixed, by the key 48. The drive-shaft C is provided with a pair of radially extending arms 18, 19, each of which are equipped with threaded members or screws 20, 21, respectively. The disk-like member 14 is provided with a lug 22 suitably projecting between the screws 20, 21 so that the disk-like member 14, being rotatable on the hub 45, can be turned or moved to different positions relative to the disk-like member 15 by adjusting the screws 20, 21, as best seen in Figure 3.

The disk-like members 14, 15 are each provided with a circumferentially spaced series of annularly elongated and respectively oppositely formed recesses or sockets 12, 13, there being, preferably, three in each series. In each of the sockets 12, 13 is rockably seated the one or inner end of the strut-members or struts 33, 34, respectively. As best seen in Figures 2, 4, the struts 33, 34 are pointed, as may be said, in the same or upward direction with respect to a diameter of the drive-shaft C drawn approximately through the sockets 12, 13, and are further disposed respectively so as to reside at an angle with respect to each other and obliquely outwardly with respect to a tangent drawn through the respective sockets 12, 13, of the drive-shaft C.

The outer ends of the struts 33, 34 are rounded suitably or otherwise adapted for engagement respectively with the rings 29, 30. As will be seen in Figure 1, the ring 29 is journaled with respect to the braking-member 41 by means of the ball thrust bearing 31, the ring 30 being likewise journaled with respect to the braking-member 42 by means of the ball thrust bearing 32.

The controlled element of the device comprises a rotatable element or, as it may be designated, a driven-shaft B, disposed within the race chamber 7 between the braking-members 41, 42. The driven-shaft B is provided with two elongated slots 9, and, in this case, is also provided with three complementary arcuate members or lugs 10 disposed for selective operative engagement with the struts 33, 34, best seen in Figures 2, 4, so that the struts 33, 34 will be utilized alternatively so as to effect torque-transmission between the drive-shaft C and the driven-shaft B, which torque-transmission will cause the struts 33 or 34, as the case may be, to become frictionally engaged with the ring 29 or 30 for movement thereof, unless otherwise restrained, in unison with and by the drive-shaft C and the driven-shaft B, the driven-shaft B being rotatively supported in the bore 3 of the end-plate 2, and extending for connecting to the actuating elements of a steering-gear or some driving machine, as the case may be.

In actual operation the rings 29, 30 are journaled on the outer ends of the struts 33, 34, respectively, and the sockets 12, 13 should be so disposed circumferentially with respect to each other so as to effect a slight lost-motion or movement of the drive-shaft C relatively to the driven-shaft B, to alternative actuation of the struts 33 or 34. Such lost-motion, however could be so adjusted by means of the screws 20, 21 so as to be practically non-existant, and, yet, wear between the struts 33, 34 and the rings 29, 30, respectively, would cause a relative amount of lost-motion, which could be eliminated, as desired, by means of the screws 20, 21. It may be expedient that the sockets 12, 13 be formed in such a manner as to limit the possible swing of the struts 33, 34 so as to prevent such respective wear between the struts 33, 34 and the rings 29, 30 from rendering the struts 33, 34 inoperative as torque-transmission means between the drive-shaft C and the driven-shaft B, as best seen in Figures 2, 4.

A wedging of the struts 33 or 34 outwardly against the ring 29 or 30, respectively, is effected whenever the driven-shaft B is caused to rotate in either direction against a rotative bias from the drive-shaft C, for then the struts 33 or 34, form a toggle linkage causing the struts 33 or 34 to pivot on their ends seated in the sockets 12 or 13, as a fulcrum, while the other or outer end of the struts 33 or 34 due to their position with respect to the sockets 12 or 13, and, being engaged with the lugs 10, are caused to move outwardly against the ring 29 or 30. So that, under the influence of these several co-incident motions, the struts 33 or 34 are grippingly engaged with the ring 29 or 30, the mechanisms contained within the rings 29, 30 and including the struts 33, 34, forming, as may be said, two sets of torque-transmission elements or strut-members operable in opposite directions.

The disk-like member 15 is provided with a pair of axially projecting arcuate lugs 16 which extend through the slots 9 of the driven-shaft B. The braking-member 42 is provided with a pair of longitudinal grooves 44 suitably for receiving the lugs 16. Disposed between the walls of the grooves 44 and the lugs 16 is a pair of rubber blocks 47 disposed suitably so that the braking-member 42 will be solidly connected to the disk-like member 15 in one direction only, the rubber blocks 47 serving to yieldingly connect the braking-member 42 to the disk-like member 15 in the other direction, best seen in Figure 6.

Similarly, the braking-member 41 is provided with a longitudinal groove 43 for receiving the lug 17, which is provided on the drive-shaft C, and a rubber block 46 disposed so that the braking-member 41 will be likewise solidly connected to the drive-shaft C in one direction and yieldingly connected to the drive-shaft C in the other direction. As will be seen in Figures 3, 6, the drive-shaft C is solidly connected for driving the braking-members 41, 42 in counterclockwise and clockwise directions respectively, and hence, also, the drive-shaft C is flexibly or yieldingly connected for driving the braking-members 41, 42 in clockwise and counterclockwise directions respectively, each of the braking-members 41, 42 being, as may be said, solidly and yieldingly connected to the drive-shaft C in opposite directions with respect to each other, for purposes soon to appear.

The rings 29, 30 are each provided with a circumferentially spaced series of helical pockets 35, 36, as the case may be, and preferably three in number, the helix of the several pockets 35 in the ring 29 being oppositely disposed to the helix of the pockets 36 in the ring 30, as best seen in Figure 5.

In each of the pockets 35, is mounted a ball 39 suitably seated on a spring 37 disposed between the end walls of the pocket 35 and the balls 39 for normally urging the latter outwardly of the pockets 35 for wedging each ball 39 between the inner wall of the pockets 35 and the flange 11, the pockets 36 being similarly equipped with the balls 40 and the springs 38 for co-operation also with the flange 11, the balls 39, 40 and the co-operating elements, as the case may be, forming, as may be said, a pair of ratchets or one-way clutches operable in opposite directions.

The braking-member 41 or 42 is effectively restrained against rotation whenever the balls 39 or 40 are caused to effect torque-transmission from the ring 29 or 30 to the housing A, for then the ring 29 or 30, by means of the bearing 31 or 32 is caused to bias the braking-member 41 or 42 into frictional engagement with the end-plate 1 or 2 of the housing A. It follows that, the braking-members 41, 42, being connected to the drive-shaft C, as has been described, are caused to effectively restrain the drive-shaft C against motion, the braking-members 41, 42 and the co-operating elements, as the case may be, forming, as may be said, a pair of friction brakes respectively operable by the one-way clutches.

The device is susceptible to many and varied applications. Particularly, it is highly adapted to be employed in connection with automotive steering-gears, the steering wheel of the vehicle being connected to the drive-shaft C and the steering linkage being connected, through a suitable reduction gear, with the driven-shaft B.

As will be understood, in steering an automobile certain vibration forces occur responsive to road shock, the wind, and shifting of the weight of the car, which normally tend to impede the steering of the automobile. Such vibration forces are resisted by the device in co-operation with, and controlled by, the steering wheel, which acts in the following manner—

In such use, referring to Figure 2, let it be supposed, for example, that such vibration forces tend to rotate the driven-shaft B counterclockwise against a controlling or, as may be said, a counteracting force from the drive-shaft C, whereupon, the struts 33, responsive to torque-transmission between the counteracting drive-shaft C and the driven-shaft B, forms a toggle causing the struts 33 to pivot on their ends seated in the sockets 12. While the other ends being in operative engagement with the lugs 10, are caused to be wedged outwardly against the ring 29, as has been described, for, in turn, effecting frictional engagement between the driven-shaft B and the ring 29.

The counterclockwise rotatory bias of the driven-shaft B, thus, transmitted to the ring 29, tends to roll the balls 39 outwardly of the pockets 35 thereof for wedging each ball 39 between the walls of its pocket 35 and the flange 11, so that the balls 39 are caused to effectively transmit the counterclockwise rotatory bias of the driven-shaft B from the ring 29 to the housing A, the springs 37, it will be understood, normally effecting such wedging action, so that the ring 29 will have very little or substantially no movement.

It follows that, by reason of such torque-transmission from the ring 29 to the housing A, the braking-member 41 will be effectively biased into frictional engagement with the end-plate 1 of the housing A, as has been described, for, in turn, restraining the drive-shaft C against rotation, it being noted that the drive-shaft C is solidly connected to the braking-member 41 in a counterclockwise direction. So that, under the influence of the frictional restraint and torque-transmission of the various parts of the device, the driven-shaft B is effectively restrained against rotation in its biased direction.

Against such counterclockwise rotatory bias of the driven-shaft B, however, the struts 34 have no restraining effect, yet, on reversal of the vibrational forces set up in steering the vehicle, the driven-shaft B is biased for clockwise movement, whereupon, the struts 34, responsive to torque-transmission between the counteracting drive-shaft C and the driven-shaft B, becomes frictionally engaged to the ring 30, the balls 40 are caused to effect torque-transmission from the ring 30 to the housing A, and the driven-shaft B is again prevented from taking further rotational movement, substantially in the manner previously set forth.

It will be seen, however, again for example, that if such vibration forces tend to rotate the driven-shaft B counterclockwise against a controlling or counteracting rotative bias from the drive-shaft C for restraining the driven-shaft B against rotation, as has been described, and then the controlling or clockwise rotative bias of the drive-shaft C is increased until it is greater than the counterclockwise rotative bias of the driven-shaft B. That the drive-shaft C, due to this change in its rotative bias or, as may be said, due to the torsional balance between the drive-shaft C and the driven-shaft B, the drive-shaft C, will be yieldingly disconnected from the braking-member 41, and the rotative bias of the ring 29 will be clockwise, against which the balls 39 have no restraining effect, since the balls 39 tend to roll inwardly in the pockets 35 thereof for releasing the ring 29, for, in turn, effecting unrestrained torque-transmission from the drive-shaft C to the driven-shaft B.

Likewise, if the driven-shaft B is biased for clockwise rotative movement and the drive-shaft C has a greater counterclockwise rotative bias, the drive-shaft C will be yieldingly disconnected from the braking-member 42. The balls 40 will roll inwardly in the pockets 36 thereof for releasing the ring 30, and the drive-shaft C will again effect unrestrained torque-transmission to the driven-shaft B.

Thus, it will be seen, motivation of the driven-shaft B by the drive-shaft C is concurrent to actuation respectively of the struts 33 or 34 by the drive-shaft C, the helix of the pockets 35, 36 being disposed so as to allow movement of the rings 29, 30 in particular directions for unrestrained torque-transmission from the drive-shaft C to the driven-shaft B. The driven-shaft B being restrained only when its rotative bias is sufficient to overcome a counteracting rotative bias of the drive-shaft C.

In use and operation, it will be seen that, when applied, in connection with the conventional type of steering-gear for use on automobiles, the steering-gear can be made highly efficient, and by use of the frictional restraint of my automatic shaft brake, a high degree of irreversibility may be had, as the term is commonly applied, and yet have a high rate of steering efficiency. It will be obvious, therefore, that less physical and mental effort will be necessary to control an automobile under the various steering conditions.

It will be understood that, if desired, the braking-members 41, 42 could be connected to the drive-shaft C or the driven-shaft B by means of a suitable arrangement of ratchets or one-way clutches, and likewise that other changes and modifications in the form, construction, arrangement, and combination of the several parts of the automatic shaft brake devices may be made and substituted for those herein shown and described without departing from the nature and principles of my invention.

Having thus described my invention, what I claim and desire to secure by Letters Patent is:

1. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, means alternatively actuable responsively to torque-transmission between said drive and driven shafts for effecting frictional engagement between said driven-shaft and said first or second ring, a non-rotatable restraining member, a pair of braking-members adapted to co-operate with said restraining member for restraining said drive and driven shafts against revolution, and oppositely acting one-way clutches respectively operatively connected to said braking-members and disposed for restricting the motion of said rings.

2. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, two sets of strut-members oppositely fulcrumed on one of said shafts and, adapted for frictional co-operation respectively with said first and second rings, means for limiting the possible swing of said strut-members, means including threaded members for adjusting the fulcrums of each set of said strut-members with respect to each other, the other of said shafts including lugs disposed for selective operative engagement with said strut-members, and oppositely acting one-way clutches disposed for restricting the motion of said first and second rings.

3. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, two sets of strut-members oppositely fulcrumed on one of said shafts and, adapted for frictional co-operation respectively with said first and second rings, the other of said shafts including lugs disposed for selective operative engagement with said strut-members, a pair of oppositely acting one-way clutches disposed for restricting the motion of said first and second rings.

4. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, alternative elements disposed for operatively connecting said drive and driven shafts to each other and, adapted for frictional co-operation respectively with said first and second rings, a stationary restraining member, said stationary restraining member including a flange, a pair of helical pockets included by said first and second rings, the helix of said pockets being oppositely disposed with respect to each other, a ball yieldingly wedged between the inner wall of each of said pockets and said flange, each of said balls adapted to effect torque-transmission to said restraining member in one way only, and a pair of friction elements respectively actuable by said balls for restraining one of said shafts against rotation.

5. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, oppositely acting sets of torque-transmission elements operatively connected to said drive and driven shafts and, adapted for frictional co-operation respectively with said first and second rings, means including threaded members for adjusting the effectiveness of said elements with respect to each other, a non-rotatable restraining member, a pair of braking-members adapted to co-operate with said restraining member for restraining said drive and driven shafts against revolution, and oppositely acting one-way clutches respectively operatively connected to said braking-members and disposed for restricting the motion of said rings, alternative brakes disposed for operatively connecting said drive and driven shafts to each other and, adapted for frictional co-operation respectively with said first and second rings, oppositely acting means disposed for restricting the motion of said rings, and means actuable responsively to torque-transmission by said oppositely acting means for restraining one of said shafts against motion.

6. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, two sets of strut-members oppositely fulcrumed on one of said shafts and, adapted for frictional co-operation respectively with said first and second rings, means for limiting the possible swing of said strut-members, means including threaded members for adjusting the fulcrums of each set of said strut-members with respect to each other, the other of said shafts including lugs disposed for selective operative engagement with said strut-members, a stationary restraining member, a pair of braking-members adapted for frictional co-operation with said restraining member, each of said braking-members being yieldingly and solidly connected to one of said shafts in opposite directions, oppositely acting one-way clutches respectively operatively connected to said braking-members and disposed for restricting the motion of said rings.

7. In a device of the kind described, in combination, co-axial driving and driven shafts, mechanisms co-operably responsive both to torque-transmission between said drive and driven shafts and to the torsional balance between said drive and driven shafts for restraining said driven-shaft against torque-transmission to said drive-shaft in either direction and, for effecting unrestrained torque-transmission from said drive-shaft to said driven-shaft in either direction, said mechanisms including first and second rings mounted for limited revolution bodily about the co-axis of said drive and driven shafts, two sets of strut-members oppositely fulcrumed on one of said shafts and, adapted for frictional co-operation respectively with said first and second rings, means for limiting the possible swing of said strut-members, the other of said shafts including lugs disposed for selective operative engagement with said strut-members, a stationary restraining member, said stationary restraining member including a flange, a pair of helical pockets included by said first and second rings, the helix of said pockets being oppositely disposed with respect to each other, a ball yieldingly wedged between the inner wall of each of said pockets and said flange, each of said balls adapted to effect torque-transmission to said stationary restraining member in one way only, a pair of braking-members respectively actuable responsively to torque-transmission by said balls and, adapted for frictional co-operation with said stationary restraining member, said braking-members being yieldingly connected to one of said shafts in opposite directions of rotation respectively and solidly connected to the same shaft in opposite directions of rotation reversed relatively to the other directions.

VERNON KINSER.